Figure 1:
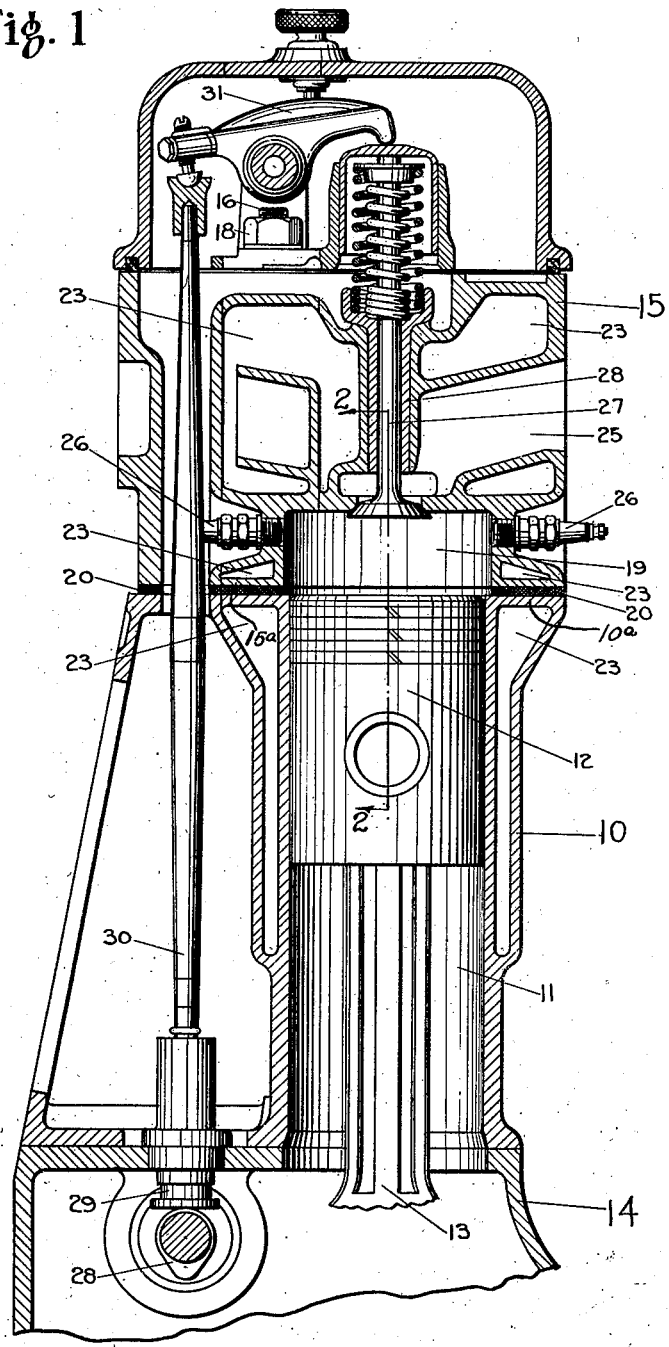

Feb. 16, 1937.  F. JEHLE  2,071,125
INTERNAL COMBUSTION ENGINE
Filed May 29, 1930  2 Sheets-Sheet 1

INVENTOR
FERDINAND JEHLE
BY R.M.Cooper
ATTORNEY

Feb. 16, 1937. F. JEHLE 2,071,125
INTERNAL COMBUSTION ENGINE
Filed May 29, 1930 2 Sheets-Sheet 2

INVENTOR
FERDINAND JEHLE
BY R M Cooper
ATTORNEY

Patented Feb. 16, 1937

2,071,125

UNITED STATES PATENT OFFICE 2,071,125

INTERNAL COMBUSTION ENGINE

Ferdinand Jehle, Cleveland, Ohio, assignor to The White Motor Company, Cleveland, Ohio, a corporation of Ohio Application May 29, 1930, Serial No. 456,998

8 Claims. (Cl. 123—191)

This invention relates to internal combustion engines, and has for its object to effect certain improvements in the construction of internal combustion engines of the high compression type.

The invention contemplates a novel engine construction embodying an effective combination of well recognized detonation controlling features including compact combustion chambers having large surface to volume ratios, small clearance spaces in communication with the combustion chambers and to function as auxiliary compression chambers, and the proper location of the ignition devices in the vicinity of the exhaust valves.

A salient feature of the invention resides in the disposition and arrangement of the comparatively narrow clearance spaces (measured in a direction parallel with the cylinder axis) which communicate with the combustion chambers. As shown in the drawings and hereinafter described, the small clearance spaces are contained between fixed surfaces located outside the cylinders. Such construction is in sharp contrast to conventional high compression engine construction in which the small clearance spaces are formed by the outer ends of the pistons and the adjacent surfaces of the cylinder head immediately preceding the ignition of the charges compressed within the combustion chambers.

Figure 3:
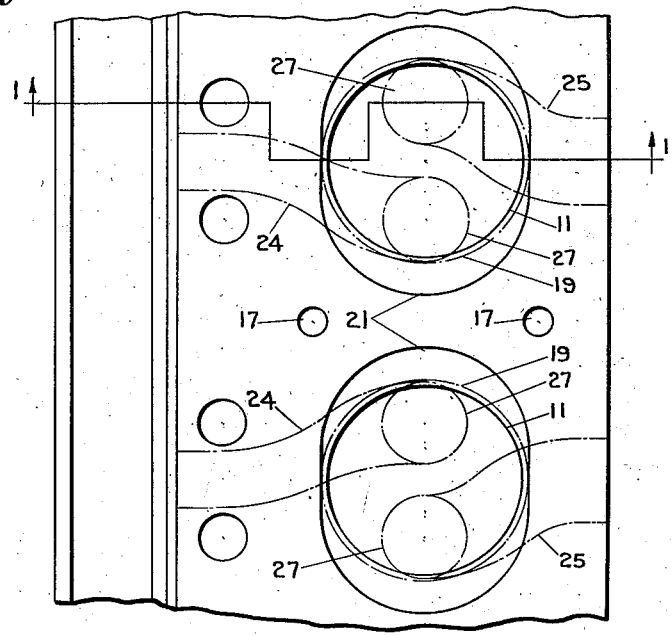

The invention will be readily understood from the description of one practical embodiment thereof illustrated in the accompanying drawings, in which:

Figure 1 is a fragmentary sectional view of a four cycle gasoline engine, the section being taken on a line corresponding with line 1—1 of Figure 3.

Figure 2:
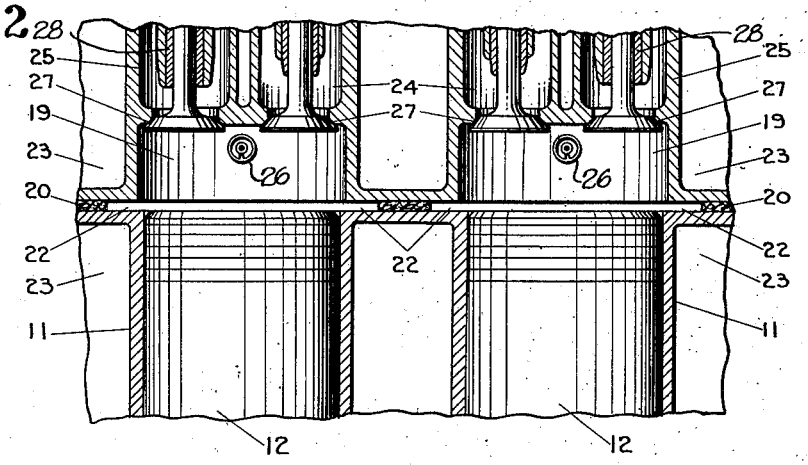

Figure 2 is a fragmentary longitudinal section of the engine shown in Figure 1, the section being taken on a line corresponding with line 2—2 of Figure 1, and Figure 3 is a fragmentary top plan view of the cylinder block of the engine with the cylinder head gasket in place, the outlines of the superadjacent combustion chambers, inlet and exhaust passages, and valves being shown in dot and dash lines which clearly illustrate their relative positions with respect to each other and to the block and gasket.

Referring to the drawings, the numeral 10 indicates the cylinder block of the engine therein illustrated. Mounted within the cylinders 11 of the block 10 are conventional type pistons 12 operatively connected by means of connecting rods 13 to a crank shaft (not shown) journalled in the engine crank case 14.

The upper exteriorly flanged end of the cylinder block 10 is closed by means including an appositioned exteriorly projecting flange on a cylinder head 15 secured in place by means of studs 16 which extend through the head into threaded apertures 17 formed in the block, and by means of nuts 18 screwed onto the upper end of the studs. The cylinder head is formed with cylindrical compression chambers 19 in axial alignment with and of a slightly larger diameter than the cylinders 11. Compressed between the enveloping flange 15a on the cylinder head 15 and the enveloping flange 10a on the block 10 there is a cylinder head gasket 20 formed with elliptical openings 21 in circumambient relation to the upper end of the cylinders 11 and the lower ends of the combustion chambers 19 whereby the margin of each of the openings 21 has diametrically spaced arcuately defined or crescent-shaped recesses. The openings 21 permit unrestricted communication between the cylinders 11 and the associated compression chambers 19, and produce separate pairs of small auxiliary compression chambers 22 intermediate the cylinder head and cylinder block which communicate with the lower ends of the respective compression chambers 19. The cylinder block 10 and the cylinder head 15 are provided with inter-communicating passages 23 which form part of a conventional circulatory water cooling system, the arrangement of passages being such that the circulating cooling water is brought in direct contact with the upper and lower walls of the chambers 22 effectively to cool the same.

The compression chambers 19 are each provided with an intake passage 24 and exhaust passage 25 and a pair of spark plugs 26. The inlet and exhaust passages 24 and 25 are formed in the head 15 superadjacent the combustion chambers 19, and are controlled by poppet valves 27 mounted in guides 28 set in the head. The spark plugs 26 are mounted in threaded apertures formed in the sides of the head and are connected with an ignition system (not shown) which produces substantially synchronous sparks between the electrodes of the plugs associated with the separate combustion chambers.

Mounted in the side of the crank case 14, there is a cam shaft 28 driven from the engine crank shaft by means of a driving connection (not shown). This shaft operates the valves 27 through the instrumentality of valve tappets 29 mounted in the upper wall of the crank case, upwardly extending push rods 30, and rocker arms 31 mounted on the upper surface of the cylinder head 15.

During operation of the engine, the upper and lower walls of the comparatively narrow, radially outwardly extending auxiliary compression chambers 22 co-act to cool both that portion of the fuel mixture that is compressed therebetween during the compression strokes of the pistons, and the additional quantities of mixture that are forced out of the combustion chambers into the chambers 22 by expansion of the burned gases following ignition. Due to the location of the chambers 22 with respect to the spark plugs 26, the fuel mixture compressed within the chambers 22 by the pistons 12 and the expansion of the burned gases will be included in the last portion of the mixture to burn within the compression chambers associated with separate cylinders, and due to having been cooled by the upper and lower walls of the chambers 22 will resist the detonation producing influences of the heat and pressure generated by the burning of the first portion of the mixture.

It will be apparent from the foregoing description that the proper ratio of cooling surface to volume for the cooling chambers 22 is dependent upon a number of factors including the shape and size of the cooling chamber, the shape and size of the associated parts of the engine, and the facility with which heat may be transferred away from the cooling surfaces of the cooling chambers; and it will be further apparent that the distance between the cooling walls of the cooling chambers may vary from a few thousandths of an inch to a substantial part of an inch in consequence of variations in the above mentioned factors.

Although the foregoing description is necessarily of a detailed character, in order that the invention may be completely set forth, it is to be understood that the specific terminology is not intended to be restrictive or confining and that various rearrangements of parts and structural details may be resorted to without departing from the scope or spirit of the invention as herein claimed.

I claim as my invention:

1. In an internal combustion engine, a cylinder block, a detachable cylinder head formed with compression chambers communicating with the cylinders in said cylinder block respectively, a gasket intermediate said cylinder block and said cylinder head, and chambers communicating with the compression chambers in said cylinder head formed between said cylinder block and said cylinder head by enlargement of the cylinder openings in said gasket, the adjacent walls of said head and said block being subjected on their outer surfaces to a cooling medium and being so spaced and of a sufficient area materially to decrease detonation by cooling the fuel mixture that is compressed therebetween during operation of the engine.

2. In an internal combustion engine, a cylinder block, a detachable cylinder head formed with a large compression chamber communicating with a cylinder in said cylinder block, a gasket intermediate said cylinder block and said cylinder head, and means providing a small amount of compression space and communicating with said large compression chamber adjacent said cylinder, said means being formed between said cylinder block and said cylinder head by enlargement of the cylinder opening in said gasket.

3. In an internal combustion engine, a cylinder block, a detachable cylinder head formed with a large compression chamber communicating with a cylinder in said cylinder block, a gasket intermediate said cylinder block and said cylinder head, and means providing a small amount of compression space and communicating with said large compression chamber adjacent said cylinder, said means being formed between said cylinder block and said cylinder head by enlargement of the cylinder opening in said gasket, and the adjacent walls of said cylinder head and said block being subjected on their outer surfaces to a cooling medium and being so spaced and of a sufficient area materially to decrease detonation by cooling the fuel mixture that is compressed therebetween during operation of the engine.

4. In an internal combustion engine, a cylinder block, a detachable cylinder head formed with a large compression chamber communicating with a cylinder in said cylinder block, a gasket intermediate said cylinder block and said cylinder head, and small compression chambers communicating with said large compression chamber formed between said cylinder block and said cylinder head by enlargement of the cylinder-registering opening in said gasket, the adjacent walls of said cylinder head and said block being subjected on their outer surfaces to a cooling medium and being so spaced and of a sufficient area materially to decrease detonation by cooling the fuel mixture that is compressed therebetween during operation of the engine.

5. The combination in an internal combustion engine, of a flanged cylinder block, a flanged cylinder head forming a large cylindrical compression chamber axially aligned with said cylinder, and having substantially the same diameter as said cylinder, walls in said engine forming in conjunction with said block and head flanges small relatively narrow compression chambers disposed radially outward from and communicating directly with the inner end of said cylindrical compression chamber adjacent said cylinder, said cylindrical compression chamber and said small compression chambers providing all of the compression space for said cylinder, inlet and exhaust conduits leading into the outer end wall of said cylindrical compression chamber, valves for said inlet and exhaust conduits located at the outer end of said large compression chamber, and ignition means near the outer end wall of said cylindrical compression chamber.

6. In an internal combustion engine, a cylinder block, a detachable cylinder head formed with a compression chamber communicating with the cylinder in said cylinder block, and a gasket interposed between said cylinder block and said cylinder head and formed with a cylinder-registering opening having diametrically spaced recessed marginal sections forming in conjunction with said block and head a pair of diametrically opposite auxiliary compression chambers, the gasket-enclosing walls of said head and block being subjected on their outer surfaces to a cooling medium and being so spaced and of a sufficient area materially to decrease detonation by cooling the fuel mixture which is compressed therebetween during operation of the engine.

7. In an internal combustion engine, a cylinder block, a cylinder head formed with a compression chamber in direct axial communication with the cylinder in said block and means for securing said block and head together and comprising a gasket therebetween, said gasket having a cylinder-registering opening the margin of which is formed with a plurality of circumferentially spaced arcuately defined recesses whereby to form, in conjunction with said block and head, a plurality of circumferentially spaced auxiliary compression chambers communicating laterally with the lower end of said first mentioned compression chamber.

8. In an internal combustion engine, an exteriorly flanged cylinder block, an exteriorly flanged cylinder head formed with a compression chamber communicating with a cylindrical opening in said block, a gasket between the flanges of said block and of said head, said gasket being provided with a cylinder-registering opening of which the margin is predeterminately recessed radially outwardly to provide auxiliary compression space beteween said flanges and means for securing said block and head and gasket in position.

FERDINAND JEHLE.